United States Patent
McCormick et al.

(10) Patent No.: US 9,468,977 B2
(45) Date of Patent: Oct. 18, 2016

(54) CYLINDRICAL GRINDING PROCESS AND AS-GROUND PART RESULTING FROM SUCH PROCESS

(71) Applicant: Kennametal Inc., Latrobe, PA (US)

(72) Inventors: Michael R. McCormick, Greensburg, PA (US); Ruy Frota de Souza Filho, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 199 days.

(21) Appl. No.: 14/182,855

(22) Filed: Feb. 18, 2014

(65) Prior Publication Data

US 2015/0231708 A1   Aug. 20, 2015

(51) Int. Cl.
| | |
|---|---|
| *B23B 29/04* | (2006.01) |
| *B23B 31/10* | (2006.01) |
| *B23B 31/08* | (2006.01) |
| *B23B 31/107* | (2006.01) |
| *B24B 3/60* | (2006.01) |
| *B23B 29/02* | (2006.01) |

(52) U.S. Cl.
CPC .............. *B23B 31/10* (2013.01); *B23B 31/08* (2013.01); *B23B 31/1075* (2013.01); *B24B 3/60* (2013.01); *B23B 29/022* (2013.01); *B23B 2226/33* (2013.01); *B23B 2231/04* (2013.01); *B23B 2250/16* (2013.01); *Y10T 279/3406* (2015.01); *Y10T 408/9098* (2015.01); *Y10T 408/94* (2015.01); *Y10T 409/30952* (2015.01); *Y10T 409/304312* (2015.01); *Y10T 409/309408* (2015.01); *Y10T 428/13* (2015.01)

(58) Field of Classification Search
CPC . B23B 31/08; B23B 31/107; B23B 31/1075; B23B 2226/33; Y10T 409/304312; Y10T 409/30952; Y10T 409/309408; Y10T 408/94; Y10T 408/95; Y10T 408/9098; Y10T 408/76; Y10T 408/73; Y10T 408/665; Y10T 279/17017; Y10T 279/17025; Y10T 279/17034
USPC ........ 409/141, 234, 232; 408/143, 231, 233, 408/238, 239 R, 127, 141; 279/8, 16–18
See application file for complete search history.

(56) References Cited

U.S. PATENT DOCUMENTS

| | | | | |
|---|---|---|---|---|
| 2,356,835 A | * | 8/1944 | Duckett | B23B 31/1173 192/81 C |
| 2,912,904 A | * | 11/1959 | Peterson | B23C 5/26 403/240 |
| 4,155,149 A | | 5/1979 | Claesson | |

(Continued)

FOREIGN PATENT DOCUMENTS

| | | | | |
|---|---|---|---|---|
| CH | 266434 A | * | 1/1950 | ............. B23B 31/08 |
| EP | 2266761 A1 | | 12/2010 | |

*Primary Examiner* — Daniel Howell
*Assistant Examiner* — Yasir Diab
(74) *Attorney, Agent, or Firm* — Matthew S. Bedsole

(57) ABSTRACT

A process of grinding a pre-ground part wherein the method includes the steps of: providing a pre-ground part containing a bore, and the pre-ground part having an exterior surface with one or more to-be-ground exterior surface regions; positioning a loading tool within the bore of the pre-ground part; exerting a loading tool load on the loading tool which in turn exerts a part load on the pre-ground part; removing material from the one or more to-be-ground surface regions of the pre-ground part when under the part load to form an as-ground part; and unloading the part load from the as-ground part.

18 Claims, 10 Drawing Sheets

(56) References Cited

U.S. PATENT DOCUMENTS

| | | | |
|---|---|---|---|
| 9,061,355 B2* | 6/2015 | Pappu | B23B 31/02 279/8 |
| 2007/0104549 A1* | 5/2007 | Hecht | B23D 77/006 408/233 |
| 2011/0129313 A1* | 6/2011 | Taguchi | B23B 31/201 409/234 |
| 2011/0266756 A1* | 11/2011 | Haimer | B23B 31/1177 279/20 |
| 2012/0207560 A1* | 8/2012 | Sakamaki | B23B 31/00 409/141 |

* cited by examiner

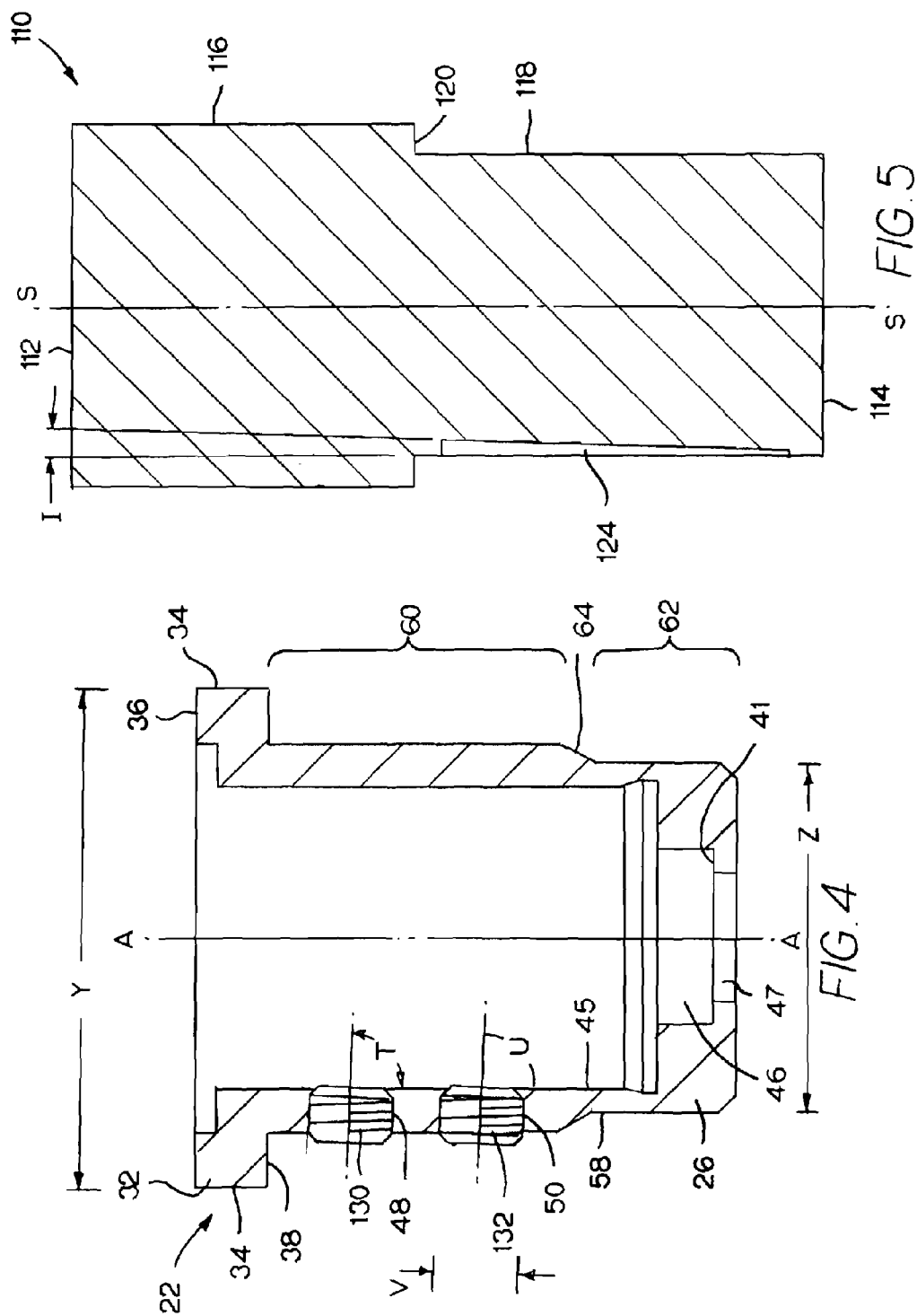

CYLINDRICAL GRINDING PROCESS AND AS-GROUND PART RESULTING FROM SUCH PROCESS

BACKGROUND

The invention pertains to a cylindrical grinding process performed on a pre-ground part, as well as the as-ground part resulting from the cylindrical grinding process performed on the pre-ground part. More specifically, the invention pertains to a cylindrical grinding process performed on a pre-ground part, as well as the as-ground part resulting from the cylindrical grinding process performed on the pre-ground part wherein the process removes material from the part so as to result in the as-ground part exhibiting a dimensional condition so that the as-ground part does not unacceptably deform under loading when in use.

During a metal cutting operation, any vibration between the cutting tool and the workpiece may result in undesirable cutting performance. For example, such vibration can result in a poor surface finish on the workpiece or an out-of-tolerance finished workpiece. In addition, any such vibration can cause the cutting tool, as well as the associated machine tool, to suffer premature damage. Still another problem associated with vibration between the cutting tool and the workpiece, especially in drilling operations, is high frequency noise. Such noise can render the work place environment less desirable. While the operator can reduce the cutting speed to achieve a reduction in the vibration between the cutting tool and the workpiece, such an action is not desirable because the material removal rate is decreased thereby leading to a decrease in the productivity of the material removal operation. Therefore, it would be highly desirable to provide a feature in a machine tool system that achieves vibration dampening so as to maintain a higher cutting speed. Further, it would be highly desirable to provide a feature in a machine tool system that achieves vibration dampening so as to reduce the generation of high frequency noise.

In one structure, a tool holder contains a bore that receives a sleeve, which in turn receives a tool, wherein the sleeve is under load through the forces necessary to retain the tool within the sleeve. Loading the sleeve can result in a deformation of the sleeve so that tolerances of the sleeve in certain locations (or regions) relative to the tool holder must be such so that these locations of the sleeve do not contact the corresponding surface of the bore. Heretofore, one way to reduce the instances of contacts between certain regions of the sleeve and the corresponding surfaces of the bore is to utilize larger tolerances. Yet, larger tolerances in this kind of system can result in adverse consequences.

For example, larger tolerances will result in greater amounts of accuracy run-out issues, wherein the cutting tool at the cutting tip will be out of alignment in relation to the centerline of the tool holder that contains the sleeve. This type of system inherently has run-out issues due to the locking screws pushing on the tool shank. Increasing the tolerance between sleeve and tool shank allows for the sleeve to be pushed further from the centerline.

In addition reduced accuracy produces poor machining quality. For instance the more run-out that a system has the more deviation there will be in the size and shape of a hole. Furthermore, the surface finish will also be affected and become less desirable. Other consequences of an increased tolerance can include reduced tool-life that is the result of too much movement of the tool shank and sleeve which may cause excess wear or chipping on the cutting surfaces.

Therefore, it becomes apparent that it would be highly desirable to provide a cylindrical grinding process which results in an as-ground part that performs in an acceptable fashion when the as-ground part is under load. In the case of a tool holder-sleeve assembly wherein the tool holder receives the sleeve, it would be highly desirable to provide such an assembly in which selected regions of the sleeve does not contact selected regions of the tool holder when the sleeve is under load. In the case of a tool holder-sleeve assembly wherein the tool holder has a bore that receives the sleeve, it would be highly desirable to provide such an assembly that does not necessitate larger tolerances to reduce the instances of contacts between the sleeve and the corresponding surfaces of the bore.

SUMMARY OF THE INVENTION

In one form thereof, the invention is a process of grinding a pre-ground part wherein the method comprises the steps of: providing a pre-ground part containing a bore, and the pre-ground part having an exterior surface with one or more to-be-ground exterior surface regions; positioning a loading tool within the bore of the pre-ground part; exerting a loading tool load on the loading tool which in turn exerts a part load on the pre-ground part; removing material from the one or more to-be-ground surface regions of the pre-ground part when under the part load to form an as-ground part; and unloading the part load from the as-ground part.

In another form thereof, the invention is an as-ground sleeve produced by the process comprising the steps of: providing a pre-ground sleeve containing a sleeve bore and one or more spaced-apart to-be-ground exterior surface regions; positioning a loading tool within the sleeve bore of the pre-ground sleeve; exerting a loading tool load on the loading tool which, in turn, exerts a sleeve load on the pre-ground sleeve; removing material from the one or more spaced apart to-be-ground exterior surface regions of the pre-ground sleeve when under the sleeve load to form the as-ground sleeve; and unloading the sleeve load from the as-ground sleeve.

In still another form thereof, the invention is an as-ground dampening sleeve-tool adapter dampening device assembly that comprises an as-ground dampening sleeve containing a sleeve bore and which has an axial forward end and an axial rearward end. The as-ground dampening sleeve further has an axial forward exterior as-ground sleeve surface and an axial rearward exterior as-ground exterior sleeve surface. The tool adapter dampening device contains an adapter bore wherein the adapter bore having an axial forward adapter bore end and an axial rearward adapter bore end. The adapter bore is surrounded at the axial forward adapter bore end by a mouth with a side mouth wall, and the adapter bore has a reduced diameter bore surface adjacent the axial rearward adapter bore end. The as-ground dampening sleeve is positioned within the adapter bore whereby the axial forward exterior as-ground sleeve surface is adjacent to the side mouth wall of the mouth, and the axial rearward exterior as-ground sleeve surface is adjacent to the reduced diameter bore surface. When a force is exerted on the as-ground dampening sleeve, the axial forward exterior as-ground sleeve surface does not contact the side mouth wall of the mouth and the axial rearward exterior as-ground sleeve surface does not contact the reduced diameter bore surface.

DESCRIPTION OF THE DRAWINGS

The following is a brief description of the drawings that form a part of this patent application:

FIG. 4 is a cross-sectional view of the dampening sleeve with the loading screws threaded into the screw threaded apertures in the dampening sleeve;

FIG. 5 is a cross-sectional view of the loading tool taken along section line 5-5 of FIG. 5A;

DETAILED DESCRIPTION

Figure 1:
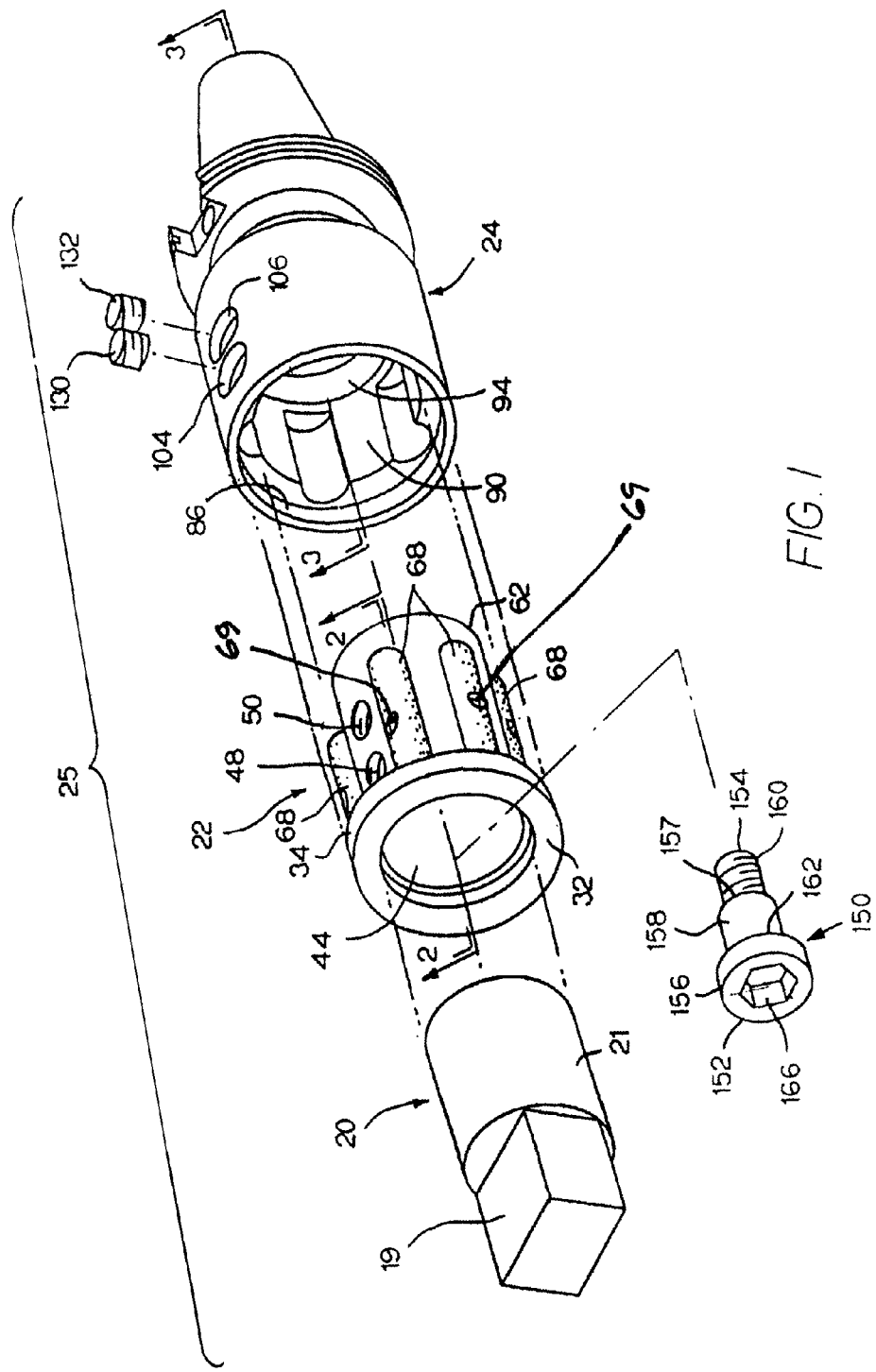
FIG. 1 is an isometric view of a tool (shown in a schematic fashion), which in operation is carried in the dampening sleeve and is shown exploded away in the longitudinal direction from the dampening sleeve, and the dampening sleeve, which in operation is carried in the tool adapter dampening device and is shown exploded away in the longitudinal direction from the tool adapter dampening device, and the tool adapter dampening device, as well as a locking screw that attaches together the dampening sleeve and the tool adapter dampening device.

Referring to the drawings, there is shown in FIG. 1 an isometric view of an assembly comprising a tool generally designated as 20, which is shown in schematic. The tool 20 could take on any suitable specific structure depending on the specific application. Exemplary tools include solid drills, endmills, reamers, modular drills, and any specialty tooling utilizing a Weldon or Whistle Notch style shank. FIG. 1 further shows a dampening sleeve (in an as-ground condition) generally designated as 22, and a tool adapter dampening device generally designated as 24. The tool 20 is shown as being exploded away in the longitudinal direction from the dampening sleeve 22. The dampening sleeve 22 is illustrated as exploded away in the longitudinal direction from the tool adapter dampening device 24. The combination of the dampening sleeve 22 and the tool adapter dampening device 24 may be considered a spindle-sleeve assembly 25. FIG. 1 illustrates a locking screw 150 which functions to attach the dampening sleeve 22 to the drill bit adapter dampening tool 24. The locking screw 150 has an axial forward end 152 and an axial rearward end 154. There is a head 156 at the axial forward end 152 and a threaded section (or shank) 160 at the axial rearward end 154. A mediate section 158 joins the head 156 and the threaded section 160. The head 156 has a rearwardly facing surface 162. There is a generally circular shoulder 157 that joins the mediate section 158 and the threaded section 160. The shoulder 157 faces in the axial rearward direction.

As a general description, when assembled, the tool 20 is received within the bore of the dampening sleeve 22, which is, in turn, received within the axial forward bore of the tool adapter dampening device 24. As illustrated in FIG. 1, two loading screws (130, 132), which are shown exploded away in a radial direction from the tool adapter dampening device 24, are utilized to mechanically secure the tool 20 within the bore of the dampening sleeve 22. As will be described hereinafter, a locking screw 150 secures the dampening sleeve 22 within the bore of the tool adapter dampening device 24. As will be discussed hereinafter, the locking screw 150 does not come in direct contact with the dampening sleeve 22, but presses against a rubber element 164 which presses against the dampening sleeve 22. The rubber element 164 is sandwiched between the dampening sleeve 22 and the locking screw 150 so as to separate the locking screw 150 from the dampening sleeve 22. When the loading screws are fully threaded in the radial inward direction, a load is exerted upon the dampening sleeve 22 that deforms the dampening sleeve 22. Yet, because of the inventive cylindrical grinding process, the dampening sleeve 22 (which is in an as-ground condition) displays at one or more selected surface regions a dimension whereby when the dampening sleeve 22 is under load, those one or more selected surface regions of the dampening sleeve 22 do not come into contact with corresponding region(s) of the tool adapter dampening device 24.

There are a number of advantages that exist because of the condition whereby one or more of the selected surfaces of the dampening sleeve 22 does not come into contact with the tool adapter dampening device 24. The following listing of advantages is not intended to be all-inclusive.

One advantage pertains to the ability to use a tighter tolerance between the dampening sleeve and adapter body which insures better accuracy (run-out), especially in a system like the spindle-sleeve assembly wherein the locking screws push against the tool shank. Tighter tolerances provide for a reduction in the extent the sleeve is pushed by the locking screws away from the centerline (or central axis) of the spindle-sleeve assembly. This results in a reduction or elimination of the cutting tip being out of alignment in relation to the centerline of the spindle that contains the sleeve. The reduction or elimination of this out-of-alignment condition, results in a reduction or elimination of a factor that can produce poor machining quality such as, for example, the more run-out that a system has the more deviation there will be in the size and shape of a hole. Furthermore, the reduction or elimination of this out-of-alignment condition will reduce or eliminate a factor that negatively affects the surface finish. In addition, the reduction or elimination of this out-of-alignment condition will reduce or eliminate a factor that can reduce tool-life which is the result of too much movement of the tool shank and sleeve (due to larger tolerances) which may cause excess wear or chipping on the cutting surfaces.

Another advantage resides in the loading of the sleeve prior to machining material from the selected areas of the sleeve. The force of the loading can be measured and used to make an accurate assessment of the magnitude of the force to apply to the locking screws when attaching the tool to the sleeve. This ability to assess the force based on the pre-machining loading facilitates the optimum operation of the assembly.

Still another advantage is that the system (or assembly) can be constructed in a way that it will function exclusively under a specific set of conditions. What this means is that optimum functionality can be achieved by the very customized grinding of material from selected areas of the sleeve that correspond to selected areas of the adapter.

Figure 2:
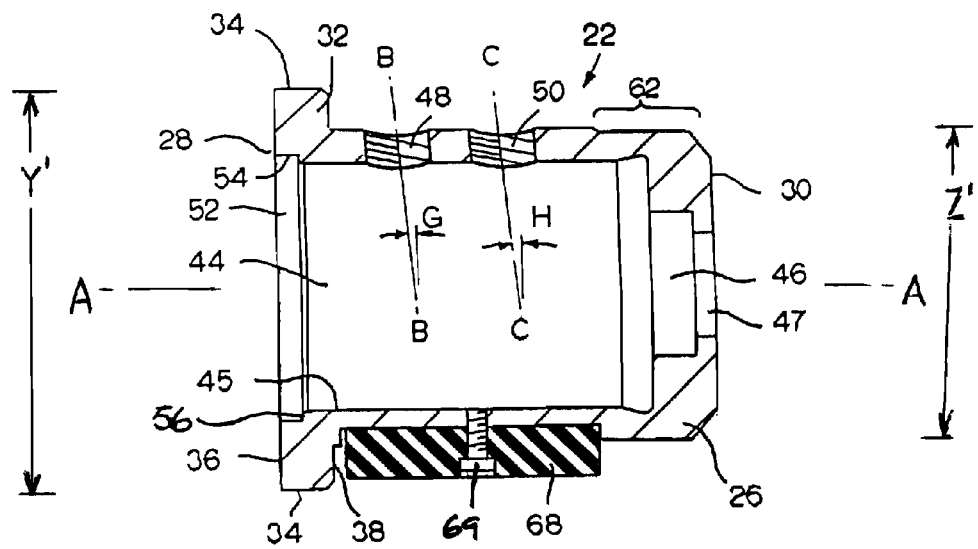
FIG. 2 is a cross-sectional view of the dampening sleeve taken along section line 2-2 of FIG. 1.

Referring especially to FIGS. 1, 2 and 4, FIGS. 1 and 2 show the dampening sleeve in an as-ground condition. FIG. 4 shows the dampening sleeve 22 in a pre-ground condition. The dampening sleeve 22 has a dampening sleeve body 26 that exhibits a generally cylindrical geometry. When used in this patent application, the term "cylindrical" is intended to mean "cylindrical" as well as "generally cylindrical" and/or "substantially cylindrical". The dampening sleeve body 26 has an axial forward end 28 and an axial rearward end 30. The dampening sleeve body 26 has a central longitudinal axis A-A as illustrated in FIGS. 2 and 4. The dampening sleeve body 26 has a cylindrical axial forward flange 32 at the axial forward end 28 thereof.

The cylindrical axial forward flange 32 has a cylindrical peripheral edge (or surface) 34. The cylindrical axial forward flange 32 has a forward face 36, which faces in the axial forward direction, and a rearward face 38, which faces in the axial rearward direction. As will become apparent hereinafter, for the as-ground dampening sleeve 22, the axial forward flange 32 exhibits a different transverse dimension at the cylindrical peripheral edge 34 from that of the pre-ground dampening sleeve 22. This is due to the removal (e.g., grinding) of material from the cylindrical peripheral edge 34 of the pre-ground dampening sleeve 22 to form the as-ground dampening sleeve 22. This means that the transverse dimension of the as-ground dampening sleeve 22 at the cylindrical axial forward flange 32 is less than the transverse dimension of the pre-ground dampening sleeve 22 at the cylindrical axial forward flange 32. More specifically, the diameter at the cylindrical peripheral surface 34 of the pre-ground dampening sleeve 22 is dimension "Y" in FIG. 4. The diameter at the cylindrical peripheral surface 34 of the as-ground dampening sleeve 34 is dimension "Y'" in FIG. 2. Dimension "Y" is greater than dimension "Y'".

The dampening sleeve body 26 contains a central enlarged diameter bore region 44, which has a cylindrical wall 45, and a pair of reduced diameter bore regions (46, 47). The dampening sleeve body 26 also contains a pair of screw threaded apertures (48, 50). As illustrated in FIG. 1, screw threaded apertures 48 and 50 are located between adjacent projections 68. Screw threaded aperture 48 has a central longitudinal axis B-B disposed at an angle G with respect to a reference line perpendicular to central longitudinal axis A-A of the dampening sleeve body 26. Screw threaded aperture 50 has a central longitudinal axis C-C disposed at an angle H with respect to a reference line perpendicular to central longitudinal axis A-A of the dampening sleeve body 26. While the drawings may exaggerate the magnitude of angles H and G, in an actual physical embodiment of the dampening sleeve body 26, angle G and angle H are each equal to about two degrees (2°). However, there should be an appreciation that angles G and H can vary depending upon the specific application. The dampening sleeve body 26 contains a mouth 52 at the axial forward end 28 thereof. The mouth 52 presents a cylindrical mouth wall 54 and a cylindrical mouth floor 56.

The dampening sleeve body 26 has an exterior surface 58 which has an enlarged diameter surface region (as shown by bracket 60) of the exterior surface 58 of the dampening sleeve body 26 and a reduced diameter surface region (as shown by bracket 62) of the exterior surface 58 of the dampening sleeve body 26. A transitional step 64 provides the transition between the enlarged diameter region 60 of the exterior surface 58 of the dampening sleeve body 26 and the reduced diameter region 62 of the exterior surface 58 of the dampening sleeve body 26. As will become apparent hereinafter, for the as-ground dampening sleeve 22, the reduced diameter surface region 62 exhibits a different transverse dimension from that of the pre-ground dampening sleeve 22. This is due to the removal (e.g., grinding) of material from the reduced diameter surface region 62 of the pre-ground dampening sleeve 22 to form the as-ground dampening sleeve 22. This means that the transverse dimension of the as-ground dampening sleeve 22 at the reduced diameter surface region 62 is less than the transverse dimension of the pre-ground dampening sleeve 22 at the reduced diameter surface region 62. More specifically, the diameter at the reduced diameter surface region 62 of the pre-ground dampening sleeve 22 is dimension "Z" in FIG. 4. The diameter at the reduced diameter surface region 62 of the as-ground dampening sleeve 34 is dimension "Z'" in FIG. 2. Dimension "Z" is greater than dimension "Z'".

The dampening sleeve body 26 contains a plurality of elongate longitudinally-oriented projections 68 that are equi-spaced about the circumference of the exterior surface 58 of the dampening sleeve body 26. In this specific embodiment, there are five such projections 68. These projections extend in a radial direction away from the exterior surface 58 of the dampening sleeve body 26. Each projection 68 has an arcuate radially outer surface, as well as an arcuate radially inner surface, and a hole through which a screw 69 passes. The screw 69 threads into a corresponding threaded hole in the dampening sleeve body 26 so as to affix the projection 68 to the dampening sleeve body 26. As well be described hereinafter, these projections 68 align and register with the corresponding grooves in the enlarged diameter bore section of the tool adapter dampening device 24. The cooperation between the grooves and the projections 68 facilitate the retention of the dampening sleeve 22 within the tool adapter dampening device 24. Further, these projections 68 are made from a rubber material (i.e., rubber projections 68) so that they facilitate the dampening (or reduction) of any energy transfer from the dampening sleeve 22 to the tool adapter dampening device 24.

Figure 3:
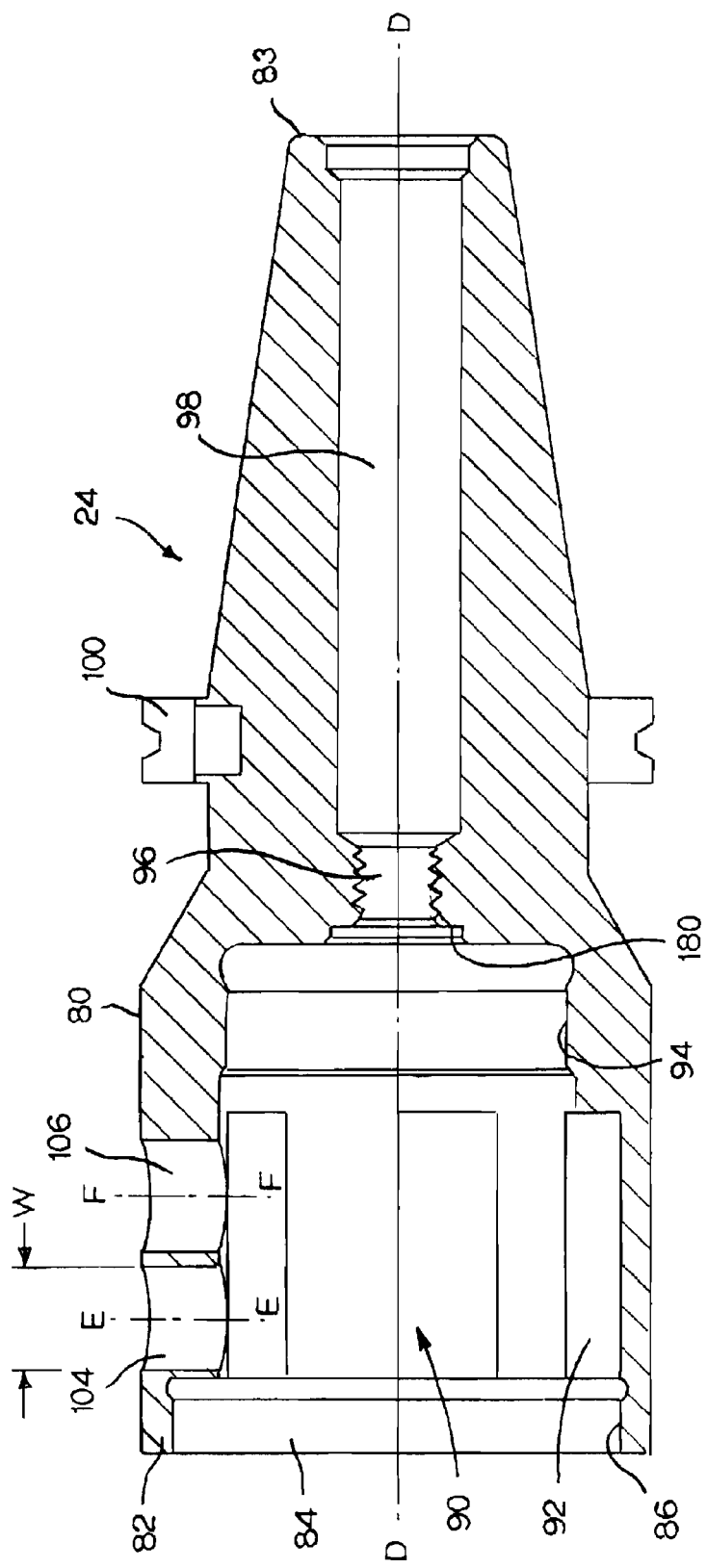
FIG. 3 is a cross-sectional view of the tool adapter dampening device taken along section line 3-3 of FIG. 1.

Referring especially to FIG. 3, the tool adapter dampening device 24 has a dampening tool body 80 which has a central longitudinal axis D-D. The dampening tool body 80 has an axial forward end 82 at which there is a mouth 84 with a cylindrical mouth wall 86. The dampening tool body 80 has an axial rearward end 83.

The dampening tool body 80 contains an enlarged diameter bore section 90 that has a plurality of longitudinally-oriented grooves 92 and an axial rearward region surface 94, which is generally cylindrical. The dampening tool body 80 further has a pair of reduced diameter bore sections 96, 98 wherein reduced diameter bore section 96 is axially forward of the reduced diameter bore section 98. The reduced diameter bore sections 96, 98 extend between the vicinity of the axial rearward region surface 90 to the axial rearward end 83.

The dampening tool body 80 further includes a radial flange 100 that projects in a radial outward direction. The dampening tool body 80 contains a pair of screw apertures 104, 106. Screw aperture 104 has a central longitudinal axis E-E and screw aperture 106 has a central longitudinal axis F-F. Each one of the central longitudinal axes E-E and F-F is disposed at about ninety degrees (90°) to the central longitudinal axis D-D of the dampening tool body 80. In the alternative, each of the central axes E-E and F-F can disposed within a range of between about 85 degrees and about 90 degrees to the central longitudinal axis D-D of the dampening tool body 80. Each of the screw apertures (104, 106) are of the same dimensions so that each one has a diameter W as illustrated for screw aperture 104 in FIG. 3. Reduced diameter bore section 96 is threaded. A shoulder 180, which faces in the axial forward direction, surrounds the opening to the threaded reduced diameter bore section 96. As will be described hereinafter, the shoulder 180 functions as an abutment against which the shoulder 157 of the locking screw 150 abuts when tightened to attach the dampening sleeve 22 to he dampening stool body 80.

Figure 5A:
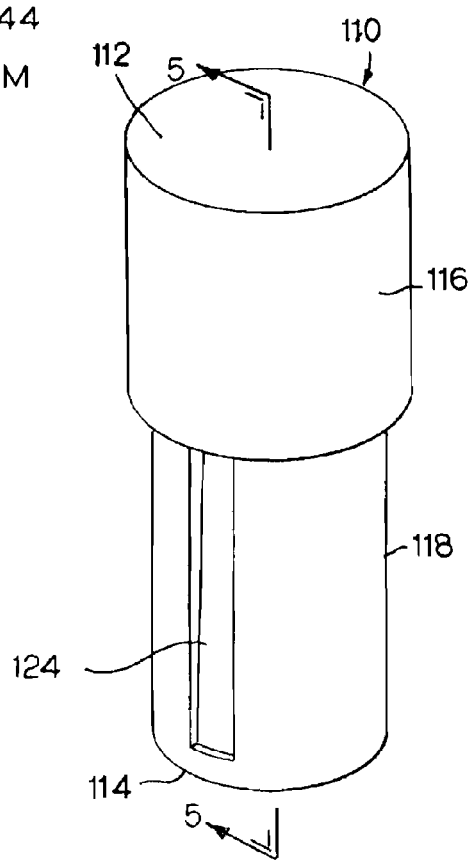
FIG. 5A is an isometric view of the loading tool.

Referring to FIGS. 5 and 5A, a loading tool generally designated as 110 is used to carry out the method of the invention. Loading tool 110 has an axial forward end 112 and an axial rearward end 114. The loading tool 110 has an enlarged diameter cylindrical head region 116 adjacent to the axial forward end 112 and a reduced diameter cylindrical shank region 118 adjacent to the axial rearward end 114. There is a rearwardly facing shoulder 120 between the enlarged diameter cylindrical head region 116 and the reduced diameter cylindrical shank region 118. The reduced diameter shank region 118 has a beveled region 124 wherein the bottom surface thereof is disposed at an angle I with respect to a reference line parallel to the central longitudinal axis S-S of the loading tool 110. While the magnitude of the angle I (see FIG. 5) in the drawing may be exaggerated, in an actual physical embodiment, angle I is equal to about two degrees (2°).

Figure 7:
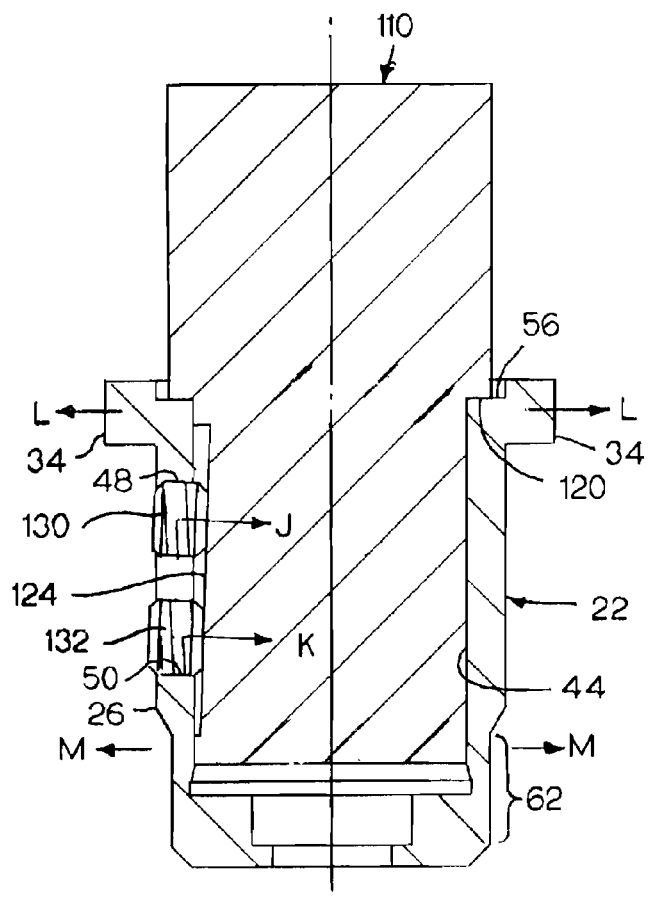
FIG. 7 is a cross-sectional view of the dampening sleeve with the loading tool received therein wherein a load is exerted on the dampening sleeve.
Figure 6:
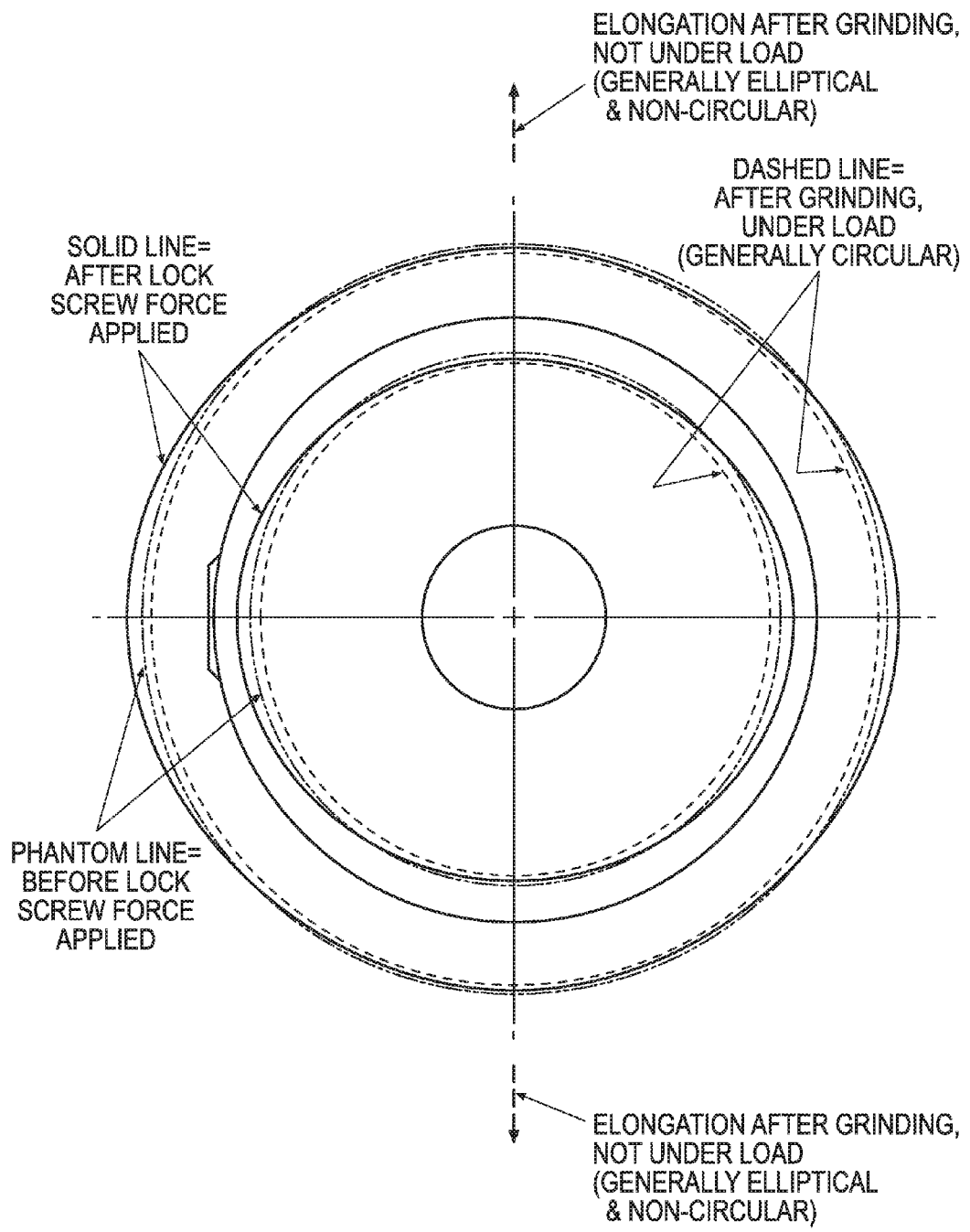
FIG. 6 is a schematic end view of the dampening sleeve showing the profile of the peripheral cylindrical surface (34) at the axial forward end of the dampening sleeve and the profile of the reduced diameter region (62) of the exterior surface of the dampening sleeve body when the dampening sleeve is under different conditions of loading and/or grinding.

In reference to the method of the invention, referring to FIG. 7, the first step comprises positioning the loading tool 110 within the central bore 44 of the dampening sleeve body 26. At this point in the process, the dampening sleeve body 26 is in a pre-ground loaded condition so as to be a pre-ground part. When in this position, the rearwardly facing shoulder 120 of the loading tool 110 contacts the mouth floor 56 and the reduced diameter region 118 of the loading tool 110 is within the central bore 44 wherein the beveled region 124 is proximate to the location of the screw threaded apertures 48, 50. Prior to the loading screws 130, 132 exerting a load on the dampening sleeve 22, the transverse surface profile of the peripheral cylindrical surface 34 and the reduced diameter section 62 are shown by the phantom lines with the designation PHANTOM LINE=BEFORE LOCK SCREW FORCE APPLIED in FIG. 6. In FIG. 6, the radial outer phantom line represents the transverse surface profile of the peripheral cylindrical surface 34 and the radial inner phantom line represents the profile of the reduced diameter region 62, each of the transverse surface profiles is generally circular in shape.

Loading screws 130 and 132 are used to help carry out the method of the invention by placing a load on the loading tool. Loading screw 130 has a central longitudinal axis N-N (see FIG. 8). Loading screw 132 has a central longitudinal axis O-O (see FIG. 8). The loading screws 130 and 132 are threaded into the screw threaded apertures 48, 50, respectively, to a pre-selected position, which exerts a pre-determined load on the loading tool 110, which in turn, exerts a load on the dampening sleeve 22. The exertion of this load is shown in schematic by force loading arrow J in the case of loading screw 130 and force loading arrow K in the case of loading screw 132. Exertion of forces J and K on the loading tool 110 cause the loading tool 110 to exert forces on the dampening sleeve body 26, which causes the dampening sleeve body 26 to radially expand. This step comprises exerting a loading tool load on the loading tool which in turn exerts a part load on the pre-ground part.

Upon completion of the loading, the dampening sleeve 22 has deformed in a way a shown by deformation arrow L in the vicinity of the peripheral cylindrical surface 34 and by deformation arrow M in the vicinity of the reduced diameter region 62 of the exterior surface 58 of the dampening sleeve 22. FIG. 6 shows the transverse surface profile of the peripheral cylindrical surface 34 and the reduced diameter section 62 by the designation SOLID LINE=AFTER LOCK SCREW FORCE APPLIED. In FIG. 6, the radial outer solid line represents the transverse surface profile of the peripheral cylindrical surface 34 and the radial inner solid line represents the transverse surface profile of the reduced diameter region 62 when the dampening sleeve 22 is in the fully loaded condition. Each of the transverse surface profiles is generally elliptical in shape. When under this load, the dampening sleeve body 26 is in a pre-ground loaded condition.

Once the dampening sleeve 22 is fully loaded condition so as to be in the pre-ground loaded condition, a pre-selected amount of material is removed (or ground) from the dampening sleeve 22 in the vicinity of the peripheral cylindrical surface 34 and in the vicinity of the reduced diameter region 62 of the exterior surface 58 of the dampening sleeve 22.

Figure 7A:
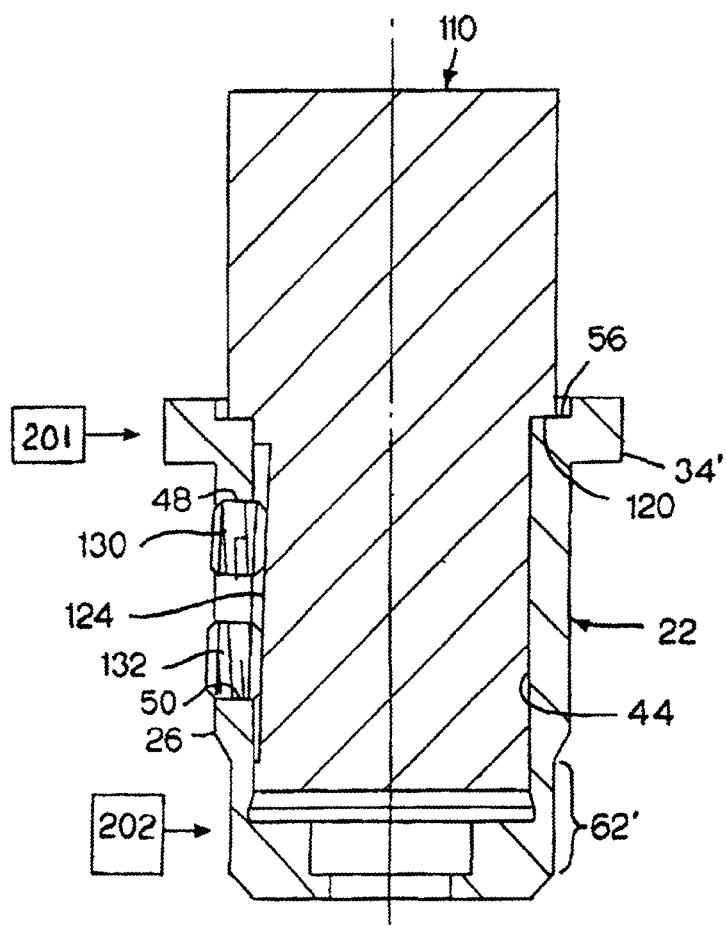
FIG. 7A is a cross-sectional view of the dampening sleeve with the loading tool received therein wherein a load is exerted on the dampening sleeve with grinding means shown in a schematic fashion.

FIG. 7A shows the dampening sleeve 22 in a fully loaded condition and grinding media 201, 202 schematically shown to contact (and thereby remove material from) the peripheral cylindrical surface 34 and the reduced diameter region 62 of the exterior surface 58 of the dampening sleeve 22. This step comprises removing material from the one or more to-be-ground surface regions of the pre-ground part when under the part load to form an as-ground part.

The amount of the material ground (or removed) from these vicinities can vary depending upon the specific application for the dampening sleeve 22. In FIG. 6, the radial outer dashed line represents the profile of the peripheral cylindrical surface 34 and the radial inner dashed line represents the profile of the reduced diameter region 62. Each of the transverse surface profiles is generally circular in shape when still under load.

Upon completion of the grinding operation and the removal of the loading tool 110 from the central bore 44 of the dampening sleeve body 26, the dampening sleeve 22 (in the as-ground condition) is ready to be used in conjunction with the tool adapter dampening device 24. In this condition, which is not under load, surfaces 34 and 62 will exhibit an elongate shape in the vertical direction of FIG. 6, which is the direction perpendicular to the direction of the load. When the dampening sleeve 22 is used to clamp a drill, the dampening sleeve 22 will be subjected to the same forces used to clamp the loading tool 110. Thus, the surfaces 34 and 62 will exhibit a circular shape.

Figure 8:
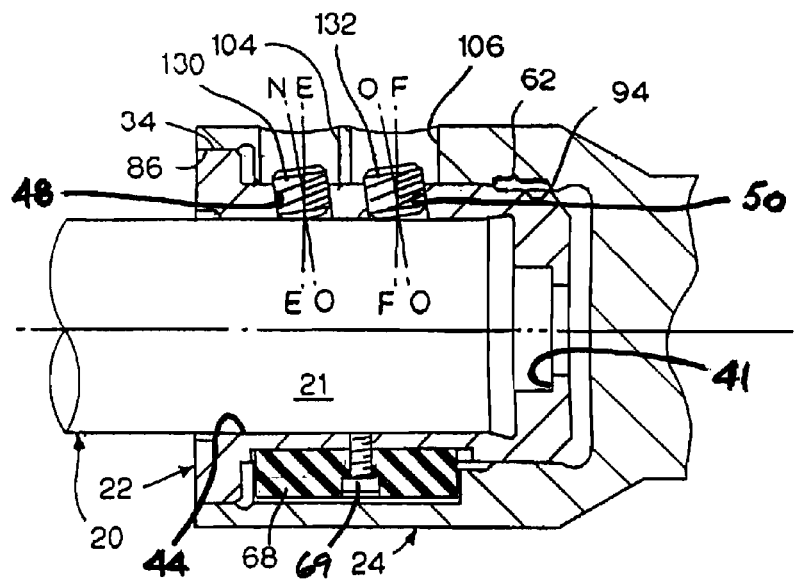
FIG. 8 is a schematic view showing the relationship between the dampening sleeve and the tool adapter dampening device when the dampening sleeve is received within the bore of the tool adapter dampening device, and a tool is received within the bore of the dampening sleeve.

Referring to FIG. 8, the tool (shown in schematic) 20 has a shank 21 which is carried within the central bore 44 of the dampening sleeve body 26. The dampening sleeve 22 is positioned within the enlarged diameter bore section 90 of the tool adapter dampening device 24 in such a fashion so that: (a) the peripheral cylindrical surface 34 of the dampening sleeve 22 is adjacent to the cylindrical mouth wall 86 of the mouth 84 of the tool adapter dampening device 24, and (b) the reduced diameter region 62 of the exterior surface 58 of the dampening sleeve body 26 is adjacent to the axial rearward surface 94 of the enlarged diameter bore section 90 of the tool adapter dampening device 24. The loading screws 130, 132 are tightened so as to exert a load against the shank 21 of the tool 20 to securely hold the tool 20 in the dampening sleeve 22.

Figure 9:
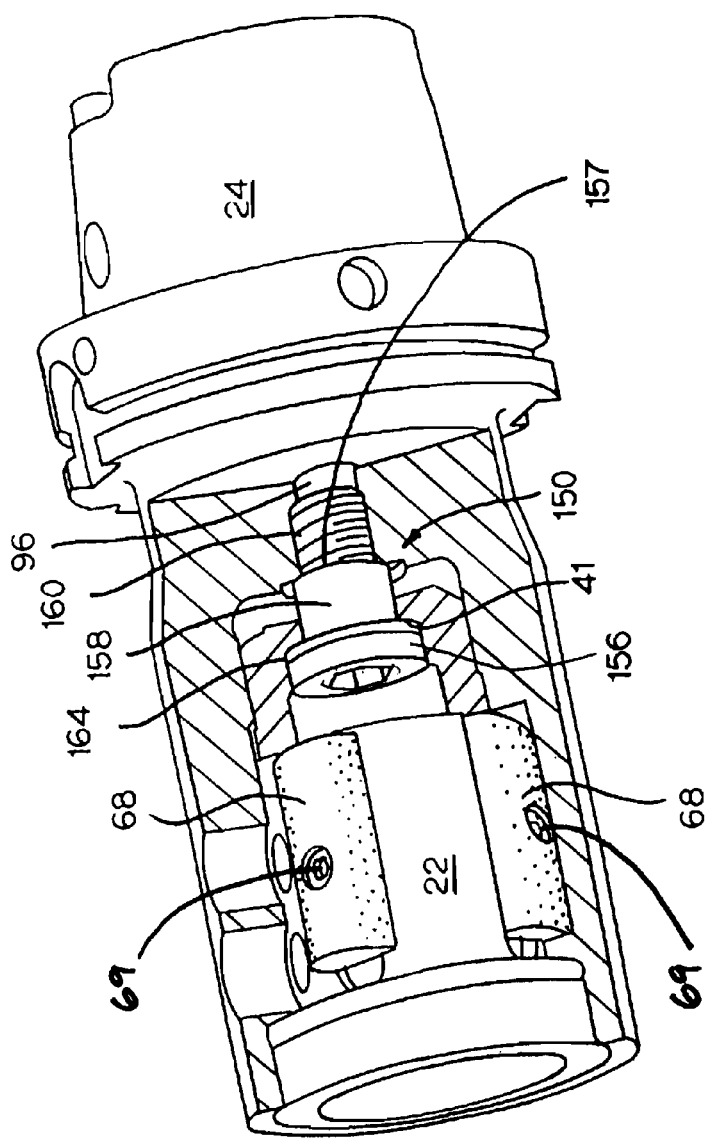
FIG. 9 is an isometric view of the dampening sleeve attached to the tool adapter dampening device by the locking screw wherein a part of the tool adapter dampening device is cut away.

Referring to FIG. 9, there is shown the dampening sleeve 22 received within the enlarged diameter bore section 90 of the drill bit adapter dampening tool 24. The threaded section 160 of the locking screw 150 is threadedly received within the reduced diameter bore section 96 whereby the dampening sleeve 22 is securely attached to the tool adapter dampening device 24. When the dampening sleeve 22 is attached to the tool adapter dampening device 24, the rubber member 164, e.g., an O-ring, is sandwiched between the rearwardly facing surface 162 of the locking screw 150 and the forwardly disposed face 41, which joins the reduced diameter bore sections 46, 47 of the dampening sleeve 22. The rubber member 164 prevents the locking screw 150 from contacting the dampening sleeve 22. Further, there should be an appreciation that the projections 68, which are made from a resilient material (e.g., rubber), help dampen the vibrations between the dampening sleeve 22 and the tool adapter dampening device 24.

The locking screw 150 is designed to come into contact with the dampening tool body 80. More specifically, the shoulder 157 of the locking screw 150 contacts the shoulder 180 of the dampening tool body 80. See FIGS. 3 and 10. Typically, the locking screw 150 abuts (contacts) the shoulder 180 of the dampening tool body 80 at a pre-determined position so as to control the amount of axial pressure exerted to the dampening sleeve 22 which, in turn, controls the amount of the axial pressure that the dampening sleeve 22 exerts on the rubber projections 68. The axial pressure exerted on the rubber projections 68 is characterized as the axial compression of the rubber projections 68. When in the condition as illustrated in FIG. 9, the amount of axial compression on the rubber projections 68 is at a first level of axial compression.

The amount of axial compression exerted on the rubber projections 68 can be varied to either increase or decrease the axial compression relative to a pre-determined value (e.g., the first level of axial compression). By varying the level of axial compression on the rubber projections 68, the operator can customize the assembly to accommodate a variety of specific applications.

Figure 10:
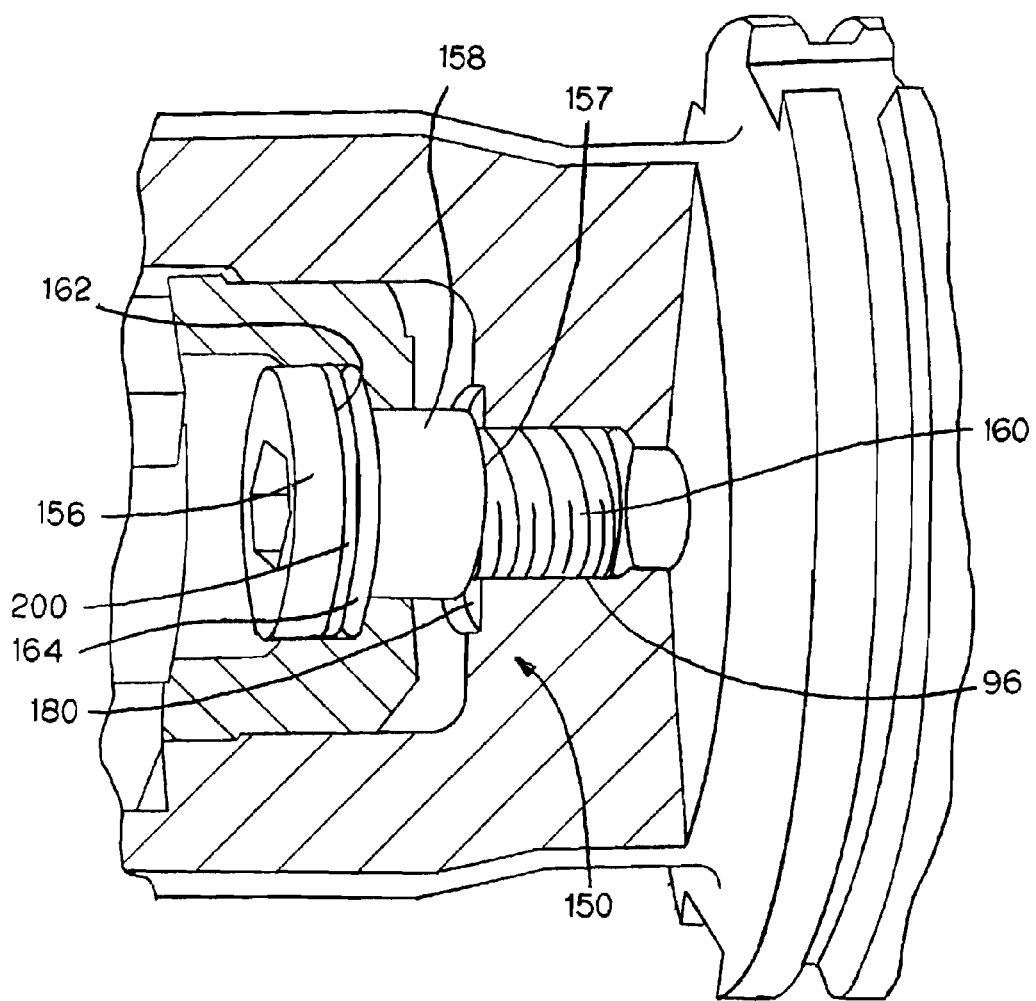
FIG. 10 is an enlarged isometric view of a portion of FIG. 9 showing the dampening sleeve attached to the tool adapter dampening device and a spacer is between the head of the locking screw and a rubber member.

To increase the level of axial compression on the rubber projections 68, as shown in FIG. 10, a spacer 200 is positioned between the rearwardly facing surface 162 of the locking screw 150 and the rubber member 164. This location of the spacer 200 can be considered a first position of a spacer on the locking screw 150. When in this position, the axial pressure on the dampening sleeve 22 is increased thereby increasing the level of axial compression on the rubber projections 68. As shown in FIG. 10, the level of axial compression exerted on the rubber projections 68 can be considered to be a second level of axial compression wherein the second level of axial compression is greater than the first level of axial compression. As an alternative, the distance between the rearwardly facing surface 162 of the head 156 of the locking screw 150 and the shoulder 180 of the dampening tool body 80 could be shortened.

Figure 11:
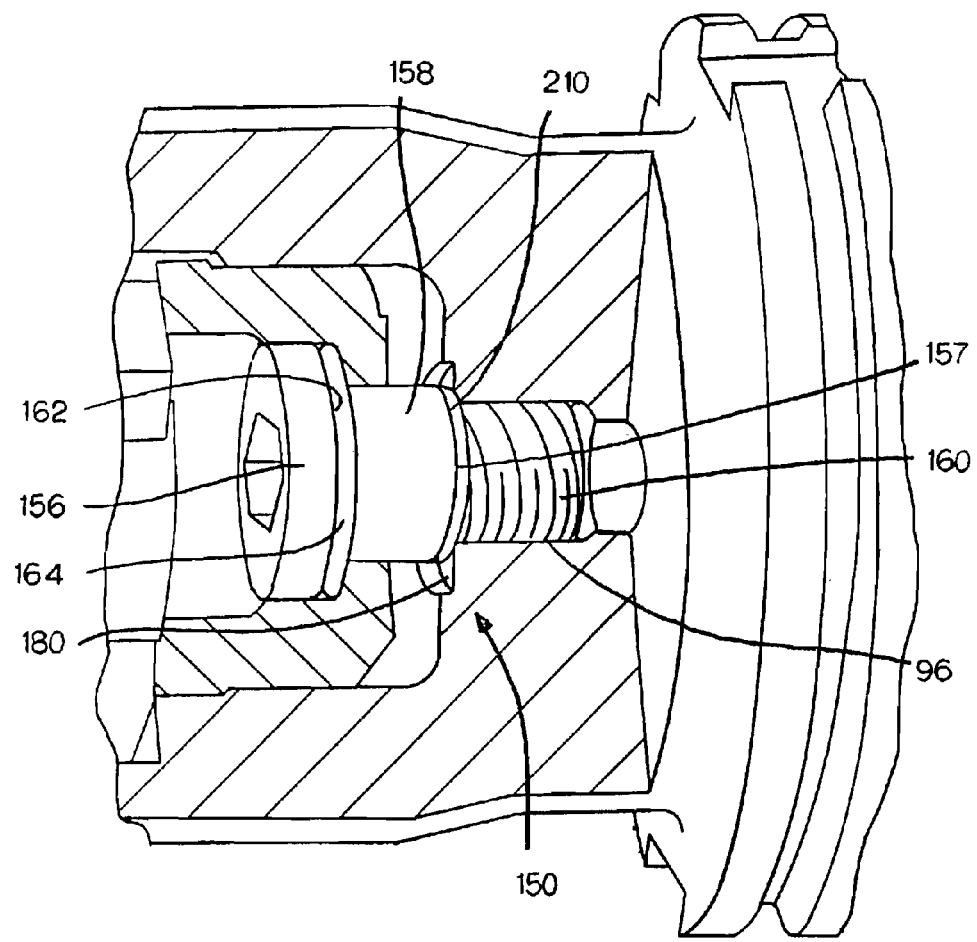
FIG. 11 is an enlarged isometric view of a portion of FIG. 9 showing the dampening sleeve attached to the tool adapter dampening device and a spacer is between a shoulder of the locking screw and a shoulder on the dampening tool body.

To decrease the axial compression on the rubber projections 68, as shown in FIG. 11, a spacer 210 is positioned between the shoulder 157 and the shoulder 180. This location of the spacer 210 can be considered a second position of a spacer on the locking screw 150. When in this position, the axial pressure on the dampening sleeve 22 is decreased thereby decreasing the level of axial compression on the rubber projections 68. As shown in FIG. 11, when in this position, the level of axial compression exerted on the rubber projections 68 can be considered to be a third level of axial compression wherein the third level of axial compression is less than the first level of axial compression.

In operation, the dampening sleeve 22 and the tool adapter dampening device 24 are placed under loads. The peripheral cylindrical surface 34 of the dampening sleeve 22 has been ground to a pre-selected dimension so that even under load, it does not touch or interfere with the cylindrical mouth wall 86 of the mouth 84 of the tool adapter dampening device 24. The reduced diameter region 62 of the exterior surface 58 of the dampening sleeve body 26 has been ground to a pre-selected dimension so that even under load, the reduced diameter region 62 does not touch or interfere with the axial rearward surface 94 of the enlarged diameter bore section 90 of the tool adapter dampening device 24. Because the peripheral cylindrical surface 34 of the dampening sleeve 22 does not touch or interfere with the cylindrical mouth wall 86 of the mouth 84 of the tool adapter dampening device 24 and the reduced diameter region 62 of the exterior surface 58 of the dampening sleeve body 26 does not touch or interfere with the axial rearward surface 94 of the enlarged diameter bore section 90 of the tool adapter dampening device 24, the following advantages exist.

One advantage is that energy from the cutting tool that is displaced and absorbed into the dampening sleeve 22 cannot be transmitted into the adapter body because the peripheral cylindrical surface 34 of the dampening sleeve 22 does not touch or interfere with the cylindrical mouth wall 86 of the mouth 84 of the tool adapter dampening device 24 and the reduced diameter region 62 of the exterior surface 58 of the dampening sleeve body 26 does not touch or interfere with the axial rearward surface 94 of the enlarged diameter bore section 90 of the tool adapter dampening device 24. Instead this energy is transferred to rubber elements (i.e., projections 68) which are mounted on the exterior of the dampening sleeve 22. Part of this energy is absorbed and later dissipated by the rubber projections 68, thus creating a dampening effect which, in turn, produces a quieter and smoother cutting operation resulting in better machining quality and longer tool life.

It is apparent from the above description taken in conjunction with the drawing figures, that the specific embodiment provides a spindle-sleeve assembly wherein the spindle receives the sleeve such that in selected regions of the sleeve do not contact selected regions of the spindle when the sleeve is under load. Such an assembly does not necessitate larger tolerances to reduce the instances of contacts between the sleeve and the corresponding surfaces of the bore. The result is an assembly that provides better machining quality, more control when used for specific applications, greater flexibility over standard tooling, reduced noise levels, improved tool life, and a wider range of application. In reference to the process, the above description taken in conjunction with the drawing figures shows a cylindrical grinding process which results in an as-ground part that performs in an acceptable fashion when the as-ground part is under load.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A process of grinding a pre-ground part, comprising the steps of:
   providing a pre-ground part containing a bore, the pre-ground part having an exterior surface with one or more spaced-apart exterior surface regions;
   positioning a loading tool within the bore of the pre-ground part;
   exerting a loading tool load on the loading tool which in turn exerts a part load on the pre-ground part;
   removing material from the one or more spaced-apart exterior surface regions of the pre-ground part when under the part load, to form an as-ground part; and
   unloading the part load from the as-ground part;
   wherein the as-ground part comprises a generally circular transverse surface profile when under load; and
   wherein the as-ground part comprises a generally elliptical and non-circular transverse surface profile when not under load.

2. The process according to claim 1 wherein the part load is exerted on the pre-ground part in the vicinity of the two spaced-apart exterior surface regions.

3. The process according to claim 1 wherein the pre-ground part contains a radially-oriented threaded aperture opening into the bore, and said process further includes, after the positioning step and before the exerting step:
   providing a screw; and
   moving the screw through the threaded aperture into contact with the loading tool.

4. The process according to claim 3 wherein the radially-oriented threaded aperture is oriented along a direction that is offset from a transverse axis of the pre-ground part.

5. The process according to claim 1 wherein, prior to said positioning of the loading tool, the one or more spaced-apart exterior surface regions of the provided sleeve comprise a generally circular transverse surface profile.

6. The process according to claim 1 wherein, when the part load is exerted on the pre-ground part, the one or more spaced-apart exterior surface regions develop a generally elliptical and non-circular transverse surface profile.

7. A sleeve produced by the process comprising the steps of:
   providing a sleeve containing a sleeve bore and one or more spaced-apart exterior surface regions;
   positioning a loading tool within the sleeve bore of the provided sleeve;
   exerting a load on the loading tool which, in turn, exerts a sleeve load on the provided sleeve;
   removing material from the one or more spaced-apart exterior surface regions of the provided sleeve when under the sleeve load, to form an as-ground sleeve; and
   unloading the sleeve load from the as-ground sleeve;
   wherein the as-ground sleeve comprises a generally circular transverse surface profile when under load; and
   wherein the as-ground sleeve comprises a generally elliptical and non-circular transverse surface profile when not under load.

8. The sleeve according to claim 7 wherein:
   the provided sleeve has an axial forward end and an axial rearward end;
   one of the spaced-apart exterior surface regions is adjacent to the axial forward end of the provided sleeve; and
   another of the spaced-apart exterior surface regions is adjacent to the axial rearward end of the provided sleeve.

9. The sleeve according to claim 7 wherein, when the sleeve load is exerted on the provided sleeve, the one or more spaced-apart exterior surface regions develop a generally elliptical and non-circular transverse surface profile.

10. An as-ground dampening sleeve-tool adapter dampening device assembly comprising:
    an as-ground dampening sleeve containing a sleeve bore and having an axial forward end and an axial rearward end, the as-ground dampening sleeve further having an axial forward exterior as-ground sleeve surface and an axial rearward exterior as-ground exterior sleeve surface;
    a tool adapter dampening device containing an adapter bore wherein the adapter bore having an axial forward adapter bore end and an axial rearward adapter bore end, the adapter bore being surrounded at the axial forward adapter bore end by a mouth with a side mouth wall, and the adapter bore having a reduced diameter bore surface adjacent the axial rearward adapter bore end;
    the as-ground dampening sleeve being positioned within the adapter bore whereby:
       the axial forward exterior as-ground sleeve surface is adjacent to the side mouth wall of the mouth, with the axial rearward exterior as-ground sleeve surface being adjacent to the reduced diameter bore surface; and
       when a force is exerted on the as-ground dampening sleeve, the axial forward exterior as-ground sleeve surface does not contact the side mouth wall of the mouth and the axial rearward exterior as-ground sleeve surface does not contact the reduced diameter bore surface; and
    a locking screw attaching the dampening sleeve to the tool adapter dampening device, and a resilient body being sandwiched between the locking screw and the dampening sleeve.

11. The as-ground dampening sleeve-tool adapter dampening device assembly according to claim 10 wherein the adapter bore has grooves, and the as-ground dampening sleeve has resilient projections wherein each of the resilient projections corresponds with one of the grooves.

12. The as-ground dampening sleeve-tool adapter dampening device assembly according to claim 10 wherein the resilient projections are under a first level of axial compression.

13. The as-ground dampening sleeve-tool adapter dampening device assembly according to claim 12 wherein a spacer is positioned at a first position on the locking screw whereby the resilient projections are under a second level of axial compression, and the second level of axial compression is greater than the first level of axial compression.

14. The as-ground dampening sleeve-tool adapter dampening device assembly according to claim 13 wherein a spacer is positioned at a second position on the locking screw whereby the resilient projections are under a third level of axial compression, and the third level of axial compression is less than the first level of axial compression.

15. The as-ground sleeve according to claim 7, wherein the provided sleeve comprises a sleeve in a non-ground condition.

16. The as-ground sleeve according to claim 7, wherein:
a longitudinal axis is defined through the sleeve bore; and
said exerting of a sleeve load comprises exerting a load in a radially outward direction with respect to the longitudinal axis.

17. The as-ground sleeve according to claim 7 wherein:
the provided sleeve includes at least one aperture disposed through the one or more spaced-apart exterior surface regions, wherein the at least one aperture opens into the sleeve bore; and
said process further comprises, subsequent to said positioning step and prior to said exerting step, displacing at least one screw through the at least one aperture and into contact with the loading tool.

18. The as-ground sleeve according to claim 17 wherein the at least one aperture is oriented along a direction that is offset from a radial direction with respect to the longitudinal axis of the sleeve bore.

\* \* \* \* \*